April 6, 1948.  J. C. SHARP  2,439,270
HEATING SYSTEM
Filed Feb. 28, 1946
Fig. 1.
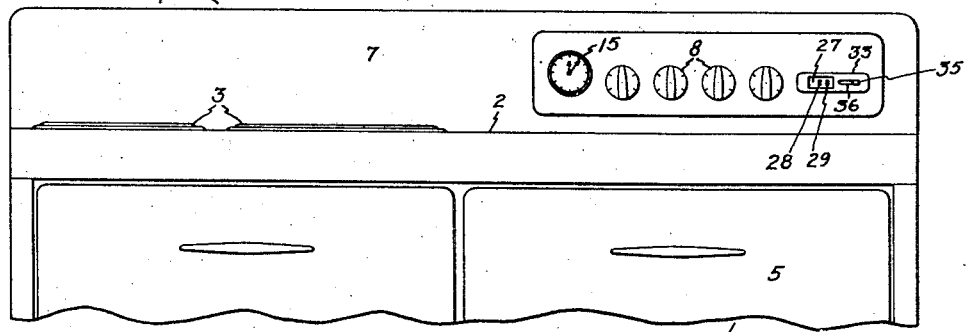
Fig. 2.
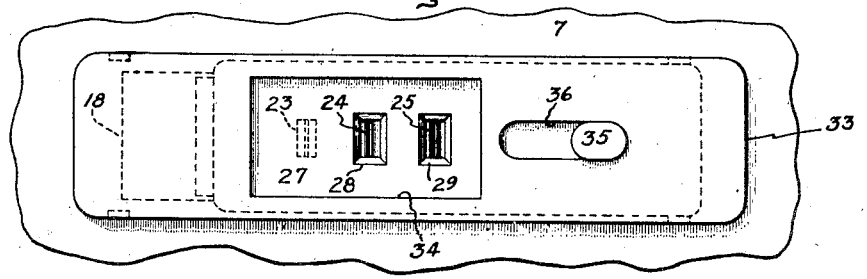
Fig. 3.
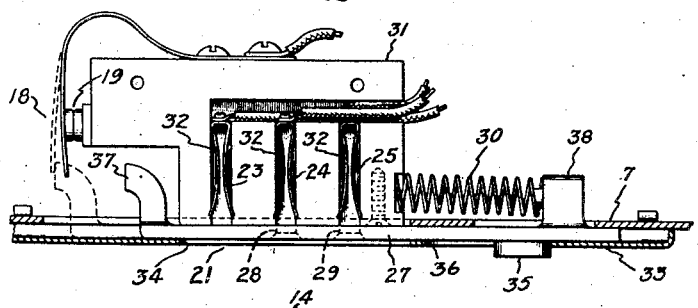
Fig. 4.
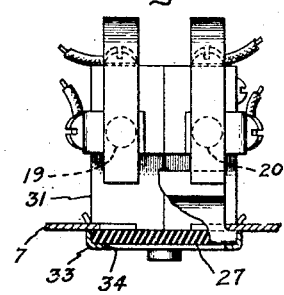
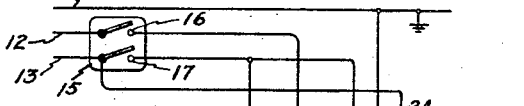
Fig. 5.
Fig. 6.
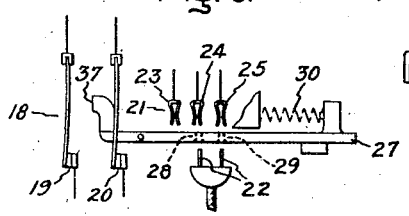
Inventor:
John C. Sharp,
by Alfred V. Bobst.
His Attorney.

Patented Apr. 6, 1948

2,439,270

UNITED STATES PATENT OFFICE 2,439,270

HEATING SYSTEM

John C. Sharp, Glen Ellyn, Ill., assignor to Hotpoint Inc., a corporation of New York Application February 28, 1946, Serial No. 650,823

4 Claims. (Cl. 219—20)

This invention relates to a heating system, more particularly to a heating system having a plurality of heating elements, and it has for its object the provision of an improved heating system of this character having time element switching means for selectively timing the heating elements.

This invention is particularly applicable to electric ranges which have an oven and heating circuit therefor, and a separate heating circuit for controlling a separate heating means such as a deep well cooker or surface unit, or an appliance receptacle for energizing an electric teakettle and the like, and it contemplates an improved heating system which has a time element switch which may be used selectively to control the energization and time periods of energization of either the oven heating circuit or the additional heating circuit.

A time element switch has been provided for ovens and the like which incorporates the oven switch in its structure as distinguished from the timing arrangement heretofore generally used which had a timer operating in conjunction with a separate manually operable oven switch. That is, the later integral timer will time a cooking period and shut off the controlled circuit at the end of the cooking period and reset itself, as distinguished from the former arrangement wherein the timer opened the heating circuit but did not reset itself and did not shut off the separate oven switch which always had to be operated "on" and "off." This invention contemplates an improved heating system whereby the integral timer and switch structure can without further change in its structure or functioning be used to time either the operation of the oven or of the additional heating appliance or element.

In carrying out my invention in one form thereof, I provide selective switch means in the circuit of the additional heating element arranged so that in one switch contact position, the additional heating circuit may be energized through the timer for timing the operation of the separate heater, and in another position the separate heater may be energized continuously and independently of the timer. The oven heating circuit is also controlled by the time element switch, but an auxiliary switch is connected in the oven circuit which operates in response to the operation of the selective switch so that when the selective switch is in position for timing the operation of the separate heater the oven heating circuit can not be energized, but when it is in its position whereby the separate heating element can be continuously energized independently of the timer the auxiliary switch closes the oven circuit to the timer whereby the operation of the oven heating periods may be automatically timed.

In one specific form of this invention the selective switch comprises a plug and socket, the socket having three terminals and the plug being selectively insertable in the first and second and in the second and third of the terminals. When inserted in the first and second it connects the separate heater for timed operation, and when in the second and third it connects the separate heater to the supply source independently of the timer. A panel is provided covering the socket, but is provided with opening means whereby when the panel is in one position the plug may be inserted in the first and second terminals, and when in a second position the plug may be inserted in the second and third. And the panel is arranged to control the oven heating circuit auxiliary switch so that this circuit can be timed only when the panel is in the second position.

For a more complete understanding of this invention, reference should be had to the accompanying drawing in which Fig. 1 is a fragmentary front elevation of an electric range provided with a heating system arranged in accordance with this invention; Fig. 2 is a fragmentary front elevation of the plug and socket connection for the separate heating circuit arranged in accordance with this invention, Fig. 2 being drawn to a considerably larger scale than Fig. 1; Fig. 3 is a horizontal sectional view taken through Fig. 2; Fig. 4 is an end view of Fig. 3; Fig. 5 is a diagrammatic representation of the two heating circuits together with their supply source and switch control means, the parts being illustrated in one operative condition; and Fig. 6 is a fragmentary view of Fig. 5 and illustrating certain elements in a different operative condition.

Referring to the drawing, this invention has been shown in one form as applied to an electric range 1 comprising a cooking top 2 supporting a plurality of surface heating elements 3. The range is further provided with an electric oven 4 under the cooking top surface 2 which oven is closed by a front door 5. It will be understood that the oven will be provided with heating means which are indicated diagrammatically in Fig. 5 and designated by the numeral 6. The range further comprises a backsplasher panel 7 rising upright at the rear edge of the cooking surface 2 and mounted on this backsplasher are a plurality of switch elements 8 for controlling the energization of the surface heating elements 3.

As pointed out previously, this invention contemplates means for timing the operation of the oven heating means 6, or the operation of a separate heating appliance; for the purpose of illustration, I have illustrated a teakettle 9 as the separate heating appliance, which kettle is provided with a heating element 10 which is energized through a twin supply cord 11.

As shown diagrammatically in Fig. 5, there is provided a three-wire supply source comprising outside wires 12 and 13 and a neutral or ground wire 14. The oven heating means 6 is energized from the outside wires 12 and 13, and it is energized through a suitable time element switch 15 which also, as shown in Fig. 1, is mounted on the back-splasher 7. The time element switch comprises a pair of switch contacts 16 and 17 which are operated by the timer to close at some set time and to open a predetermined interval of time thereafter. The time element switch 15 has been shown quite diagrammatically because its details of construction form no part of this invention and since any suitable time element switch having this functional characteristic may be used. As shown diagrammatically in Fig. 5, the time element switch is inserted between the supply wires 12 and 13 and the oven heating means 6, and also as there shown there is interposed between the oven heating means 6 and the timer an auxiliary switch 18 comprising sets of contacts 19 and 20; when these contacts 19 and 20 are open as shown in Fig. 5 the oven heating means 6 cannot be energized, whereas when they are in their closed position as shown in Fig. 6 the oven heating means 6 may be energized from the wires 12 and 13 through the time element switch 15.

The heating system further comprises a selective switch 21 interposed between the separate heating appliance 9 and the time element switch 15 and the supply source 12, 13, 14, which switch is in the nature of a plug and socket comprising a twin terminal plug 22 and a socket having three spaced-apart socket elements 23, 24 and 25. The socket elements 23 and 24 are spaced apart a distance equal to the spacing of the twin terminals 22, and the terminals 24 and 25 are spaced apart a similar distance, and furthermore the three socket elements are positioned in alignment. Because of this arrangement the plug 22 may be inserted only in the first set of socket terminals 23 and 24, or only in the second pair 24 and 25. It will be observed that when it is inserted in the first set the heating element 10 of the separate heater 9 can be energized from the outside conductor 13 of the supply source to the neutral conductor 14 only through the timer contact 17. In other words, in this first position of the plug, the auxiliary appliance 9 is connected for timed operation. On the other hand when the plug is in contact with the socket terminals 24 and 25 the heating element 10 of the separate heater is energized directly across the outside conductor 13 and the neutral conductor 14 of the supply source independently of the timer; here the timer is not connected to the additional heating circuit.

In order to prevent operation of the oven when the teakettle 9 is being controlled by the timer 15, the auxiliary oven switch 18 is interlocked with the heating switch for the appliance 9. For this purpose, there is provided a panel 27 which covers the socket elements 23, 24 and 25 and which is provided with a pair of spaced-apart openings 28 and 29, the spacing between the openings being equal to the spacing between the twin terminals of the plug 22. This cover slides transversely across the openings of the receptacles 23, 24 and 25 and when it is in its position shown in Fig. 5 the plug 22 can be inserted through the openings 28 and 29 for reception by the socket elements 23 and 24, whereas it cannot be inserted in the socket elements 24 and 25. When the panel 27 is shifted toward the right, as viewed in Figs. 5 and 6, from the position of Fig. 5 to the position of Fig. 6 then the plug 22 can be inserted only in the sockets 24 and 25. This panel operates directly the switch blades of the contacts 19 and 20 of the auxiliary switch 18 so that when the panel is in its position of Fig. 5 this switch 18 is open whereas in its position of Fig. 6 the switch blades are closed. A compression spring 30 is provided for biasing the panel toward the right so that when the plug is in its position of Fig. 5 and is removed from the sockets 23 and 24 the panel automatically shifts to its position of Fig. 6 which permits timed operation of the oven and which permits the auxiliary appliance to be energized continuously independently of the timer by plugging the plug 22 into the sockets 23 and 24.

The selector switch 21 also preferably will be mounted in the backsplasher 7. As shown it comprises an insulating housing 31 provided with three spaced-apart chambers 32 for receiving the three terminal sockets 23, 24 and 25 respectively. This housing is mounted in fixed position on the backsplasher 7, and is covered by a front panel 33 which covers the sliding panel 27; preferably, and as shown in Fig. 4, the panel 27 will be made of a suitable insulating material, such as a relatively strong insulating fiber. The front panel 33 is provided with an elongated rectangular opening 34 so that access can be had to the sockets 23 and 24, and 24 and 25 by the plug 22 through the openings 28 and 29 of the panel 27 in the manner described above. Preferably the panel 27 will be provided with a forwardly projecting stop pin 35 which slides in an elongated slot 36 provided in the front panel 33 and which by its engagement with the ends of the slots defines the two operating positions of the panel.

The auxiliary switch 18 comprising the two switch contacts 19 and 20 preferably will be mounted upon the housing 31, as shown, and is arranged so that its switch blades are contactible by an inwardly extending arm 37 provided on the panel 27, whereby when the panel is in its position of Figs. 3 and 6 the auxiliary switch 18 is closed, while when it is in its position of Fig. 6 the auxiliary switch is open. It will be observed that the compression spring 30 is interposed between the housing 31 and a suitable inwardly-extending abutment 38 provided on the panel so that it biases the panel toward the right as viewed in Figs. 3, 5 and 6.

Thus, it will be observed that if it be desired to operate the oven, the plug, if it is in its position of Fig. 5, must be removed therefrom which operation will permit the panel 27 to move to the right under the influence of its spring 30 and thereby permit the oven switch 18 to close. This operation, of course, connects the oven heating means 6 to the timer which may be then set for the desired timed operation. At this time the separate heater appliance 9 may be energized from the supply source independently of the timer by plugging the plug into the terminal sockets 24 and 25 which are now available.

Now, if it be desired to time the operation of the separate heater 9, the plug contacts should be inserted in the openings 28 and 29 and the panel shifted to its position of Fig. 5 and then the plug pushed in so that its terminals are received in the sockets 23 and 24. This operation, of course, connects the heating means 10 of the appliance 9 to the supply source through the timer switch. This operation of the panel 27 also opens the auxiliary switch 18 to disconnect the oven heating means 6 from the timer and the supply source.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A heating system for electric ranges and the like provided with an oven and a heating circuit therefor and also with an additional heating circuit for a separate heating element, said additional heating circuit comprising a twin supply plug for supplying said separated heating element, and a three socket element receptacle therefor, said plug being selectively receivable in the first and second and in the second and third of said sockets respectively, a supply circuit for said oven and additional heating circuits, a timer in said circuit for timing the periods of energization of said circuits, electrical connections between the three sockets of said receptacle and said timer and supply circuit arranged so that when said plug contacts said first and second sockets said plug is connected to said supply circuit through said timer for timed operation of said additional heating element and when in contact with said second and third sockets is connected to said supply circuit independently of said timer, a guide element shiftable between two positions to locate said plug for contact with said first and second sockets only and secondly to locate said plug for contact with said second and third sockets only, and switching means controlling said oven heating circuit operated responsively to the shifting of said guide element so that said oven circuit can be connected to said supply circuit through said timer only when said guide element is located so that said plug may contact said second and third sockets.

2. An electric range comprising an oven, an oven heating circuit therefor, an electrical supply circuit, a time element switch connected between said supply and oven heating circuits for controlling and timing the periods of energization of said oven, said range having an additional heating element separate from said oven heating element and an additional heating circuit therefor, and means controlling the energization of said additional and said oven heating circuits comprising a twin plug connected to said additional heating circuit and a socket element therefor having three terminal elements constructed and arranged so that said plug may be placed in contact with the first and second and the second and third of said elements respectively, and said three terminal elements being connected to said supply circuit and time element switch so that when said plug is connected to said first and second elements said additional circuit is connected to said supply circuit through said time element switch and may be controlled thereby in accordance with a time interval, and when connected to said second and third terminal elements said additional circuit is connected to said supply circuit independently of said time element switch, a movable panel positioned over and slidable with reference to said socket elements and provided with aperture means positioned so that when said panel is in one position said plug can be inserted only in said first and second terminal elements and when in a second position can be inserted only in said second and third terminal elements, and auxiliary switch means controlling said oven heating circuit operated by said panel so that said switch means closes the oven heating circuit to said time element switch only when said panel is in said second position.

3. An electric range comprising an oven, an oven heating circuit therefor, an electrical supply circuit, a time element switch connected between said supply and oven heating circuits for controlling and timing the periods of energization of said oven, said range having an additional heating element separate from said oven heating element and an additional heating circuit therefor, and means controlling the energization of said additional and said oven heating circuits comprising a twin plug connected to said additional heating circuit and a socket element therefor having three terminal elements constructed and arranged so that said plug may be placed in contact with the first and second and the second and third of said elements respectively, and said three terminal elements being connected to said supply circuit and time element switch so that when said plug is connected to said first and second elements said additional circuit is connected to said supply circuit through said time element switch and may be controlled thereby in accordance with a time interval, and when connected to said second and third terminal elements said additional circuit is connected to said supply circuit independently of said time element switch, a movable panel positioned over and slidable with reference to said socket elements and provided with aperture means positioned so that when said panel is in one position said plug can be inserted only in said first and second terminal elements and when in a second position can be inserted only in said second and third terminal elements, and auxiliary switch means controlling said oven heating circuit operated by said panel so that said switch means closes the oven heating circuit to said time element switch only when said panel is in said second position, and means for shifting automatically the panel to said second position when said plug is removed from its said first and second terminal elements.

4. A heating system for a pair of heating elements comprising a supply circuit, a pair of control circuits for said heating elements respectively, a time element switch connected to said supply and control circuits for controlling both the energization of and the periods of energization of said control circuits, an auxiliary switch connected between said time element switch and the first control circuit, a plug and socket connection interposed in the second control circuit comprising three socket elements and a coacting twin terminal plug connected to the second circuit to control its energization, said plug being insertable in the first and second and in the second and third of said socket elements respectively, electrical connections between said three socket elements and said supply source and time element switch so that when said plug is inserted in said first and second elements said second control circuit is connected to said supply source through said time element switch and when in said second and third socket elements is energized from said supply source independently of said time element switch, a panel slidable over said socket elements and provided with opening means so that when said panel is in one position said plug can be inserted only in said first and second socket elements and when in a second position said plug can be inserted only in said second and third socket elements, and connection means between said panel and auxiliary switch for operating said auxiliary switch to disconnect said first heating circuit when said panel is shifted to said first position and for operating it to reconnect said first heating circuit with said time element switch when said panel is shifted to said second position.

JOHN C. SHARP.

REFERENCES CITED

The following references are of record in the file of this patent:

UNITED STATES PATENTS

| Number | Name | Date |
|---|---|---|
| 2,327,632 | Frazier | Aug. 24, 1943 |